Nov. 25, 1952 L. L. JAMES 2,619,389
HUB ADAPTER FOR TRUCK AXLES
Filed Nov. 17, 1950

Inventor
Lloyd L. James

By Clarence A. O'Brien
and Harvey B. Jacobson
Attorneys

Patented Nov. 25, 1952

2,619,389

UNITED STATES PATENT OFFICE 2,619,389

HUB ADAPTER FOR TRUCK AXLES

Lloyd L. James, Philo, Calif.

Application November 17, 1950, Serial No. 196,234

1 Claim. (Cl. 301—1)

This invention relates to new and useful improvements and structural refinements in rear axles of trucks and the principal object of the invention is to provide substantial supporting reinforcements for wheel hubs and screws which secure the wheel hubs to flanges of axles, thus relieving the heavy strain on said hubs and screws and preventing the screws from breaking.

The above object is achieved by the provision of an adapter which is intended to be positioned on the conventional hub and is provided with an outturned and an inturned flange, the outturned flange of the adapter being secured by the same studs which secure the wheel to the hub, while the inturned flange of the adapter is secured by the same screws which attach the hub to the flange of the axle, in which manner the inturned flange provides substantial support for the screws, as aforesaid.

Some of the advantages of the invention reside in its extreme simplicity of construction, in its efficient and dependable operation, in its adaptability to economical manufacture, and in its adaptability to convenient installation on truck axles of different sizes and types.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
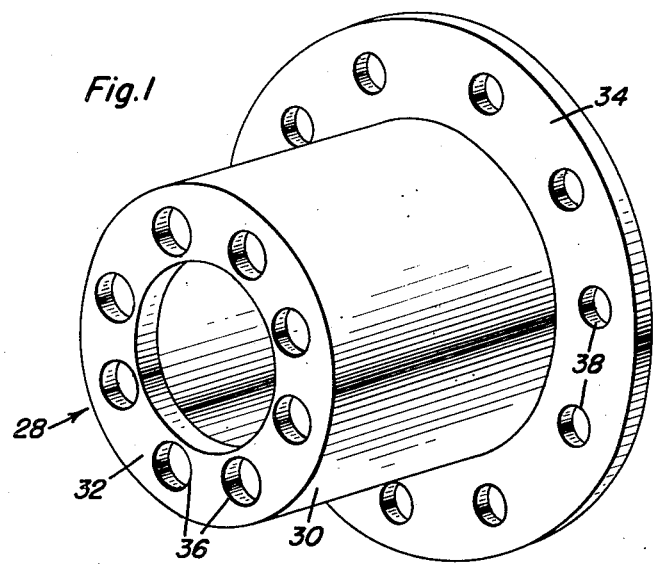
Figure 1 is a perspective view of the invention per se.

Referring now to the accompanying drawings in detail, the general reference character 10 designates a conventional truck rear axle assembly including an axle housing 12 having an axle 14 rotatably positioned therein, the axle 14 having a flange 16 secured by a plurality of bolts or screws 18 to a hub 20 which is rotatable on the housing 12 and is provided with a plurality of studs 22 for securing a wheel assembly 24 thereto.

A gasket 26 is usually interposed between the flange 16 and the outer face of the hub 20 and the invention resides in the provision of a reinforcing adapter which is designated generally by the reference character 28.

The adapter 28 embodies in its construction a substantially tubular body 30 which is provided at its outer end with an inturned flange 32 while an outturned flange 34 is provided at the inner end of the body, the two flanges 32, 34 being provided with sets of apertures 36, 38, respectively as is best shown in Figure 1.

Figure 2:
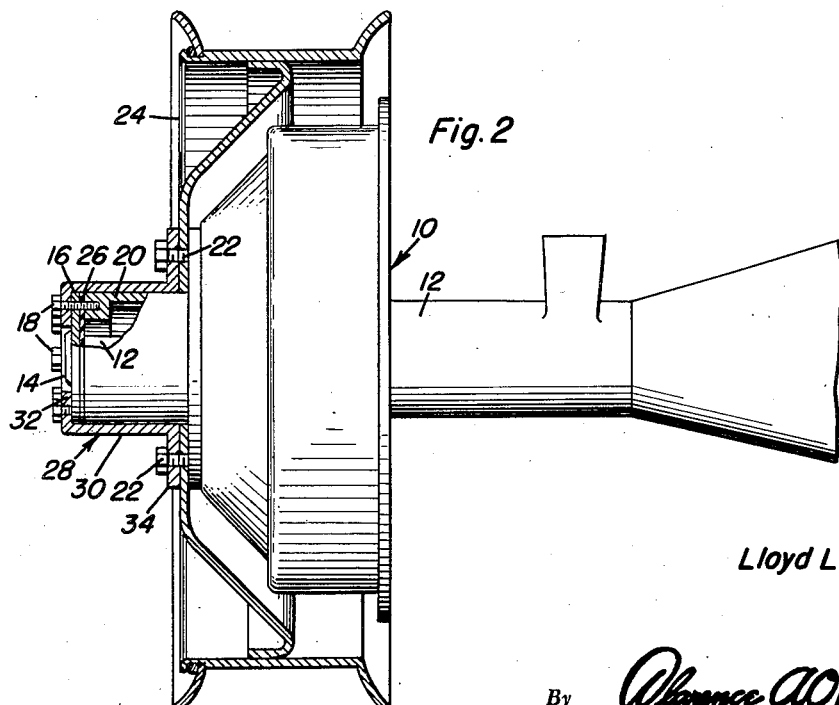
Figure 2 is a sectional view of the invention installed on the rear axle assembly of a truck, the rear axle assembly being partially broken away so as to reveal the manner in which the invention is mounted.

When the invention is to be installed, the adapter 28 is positioned on the hub 20 as shown in Figure 2 so that the flange 34 abuts the wheel 24 and the flange 32 abuts the flange 16 of the axle 14, the apertures 38 receiving the studs 22 while the bolts or screws 18 extend through the apertures 36. It will be apparent from the foregoing that in this manner the adapter 28 is sustained in position by the same or slightly longer studs and screws which are already provided on the rear axle assembly, and by virtue of the screws 18 extending through the apertures 36 of the flange 32 of the adapter, the latter will substantially support and reinforce the screws 18 as well as the hub 20 so as to prevent the same from breakage when under strain.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a truck rear axle assembly, the combination of an axle housing, an axle rotatable therein and provided at its outer end with a flange, a hub rotatable on said housing and having an outer end in abutment with said flange, a wheel positioned on said hub, an adapter positioned on said hub and comprising a substantially tubular body having an inturned flange and an outturned flange at the respective outer and inner ends thereof, a set of screws extending through the inturned flange of said body and through the flange of said axle into the outer end of said hub, and a set of studs securing the outturned flange of the body to said wheel and the hub, whereby the outer end portion of the hub is substantially reinforced by said adapter.

LLOYD L. JAMES.

REFERENCES CITED

The following references are of record in the file of this patent:

UNITED STATES PATENTS

| Number | Name | Date |
|---|---|---|
| 1,286,438 | Smith | Dec. 3, 1918 |
| 1,313,405 | Mason | Aug. 19, 1919 |
| 1,960,457 | Roche | May 29, 1934 |
| 2,398,349 | Ash | Apr. 16, 1946 |
| 2,453,635 | Martin | Nov. 9, 1948 |